Jan. 21, 1947.  S. K. MALEK  2,414,754
CONTROL DEVICE
Filed July 15, 1943  2 Sheets-Sheet 1
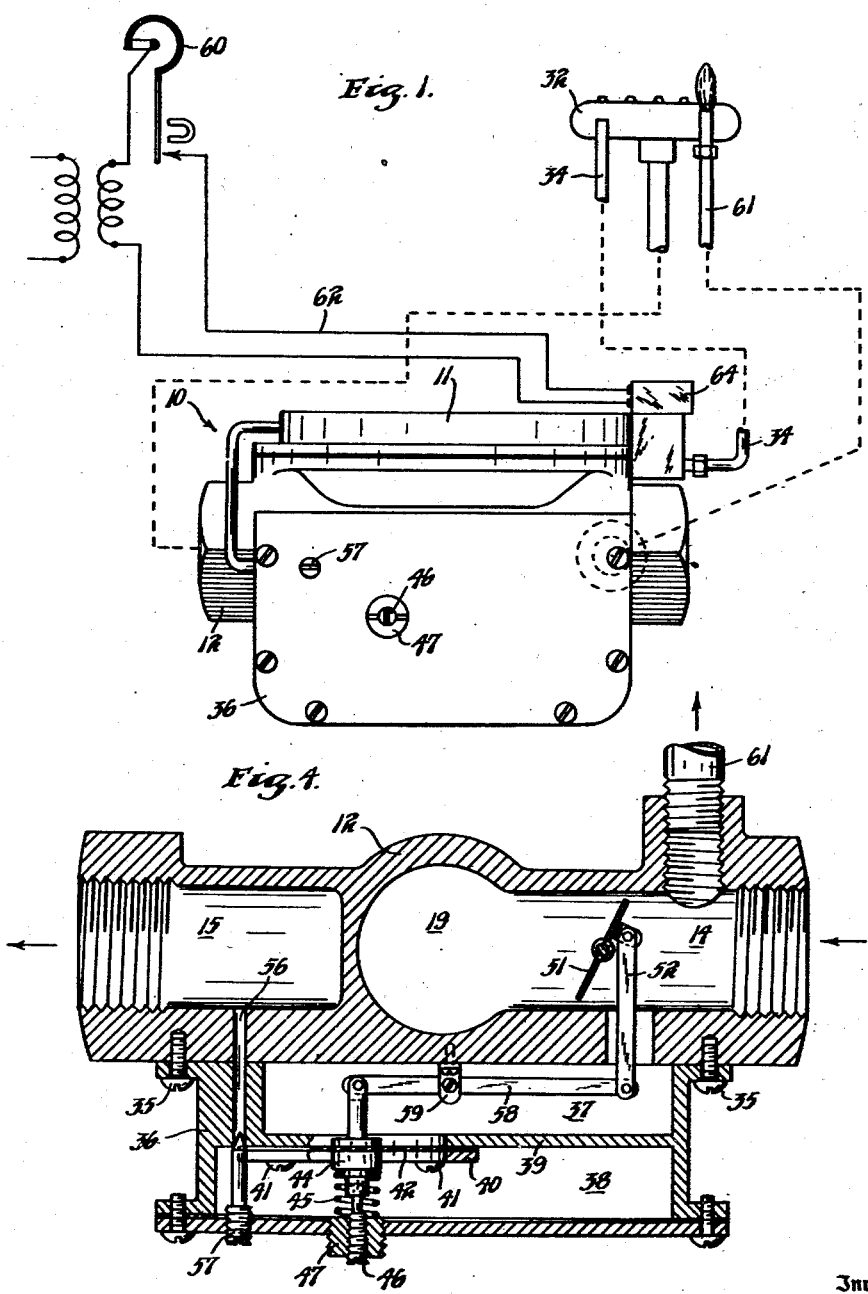
Inventor
SIDNEY K. MALEK
By George H. Fisher
Attorney Jan. 21, 1947. S. K. MALEK 2,414,754
CONTROL DEVICE
Filed July 15, 1943 2 Sheets-Sheet 2
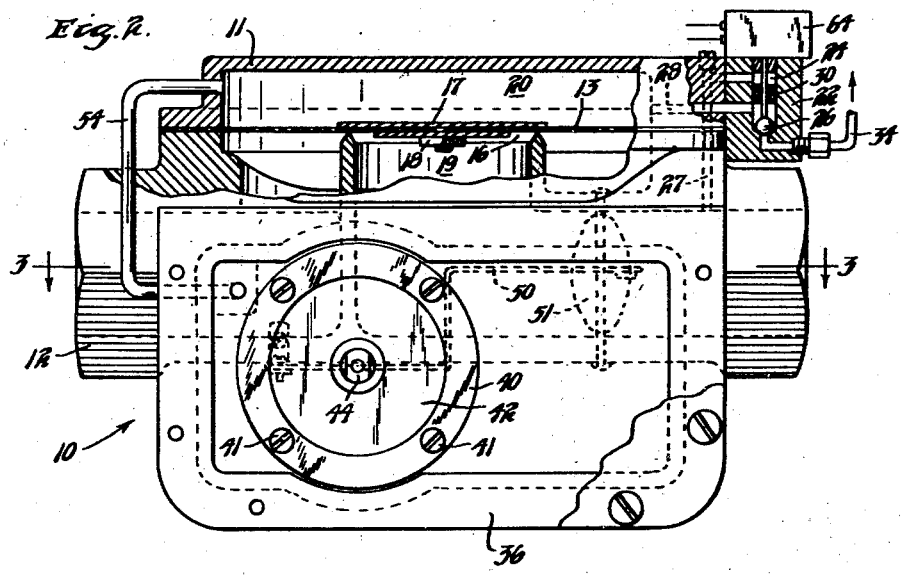
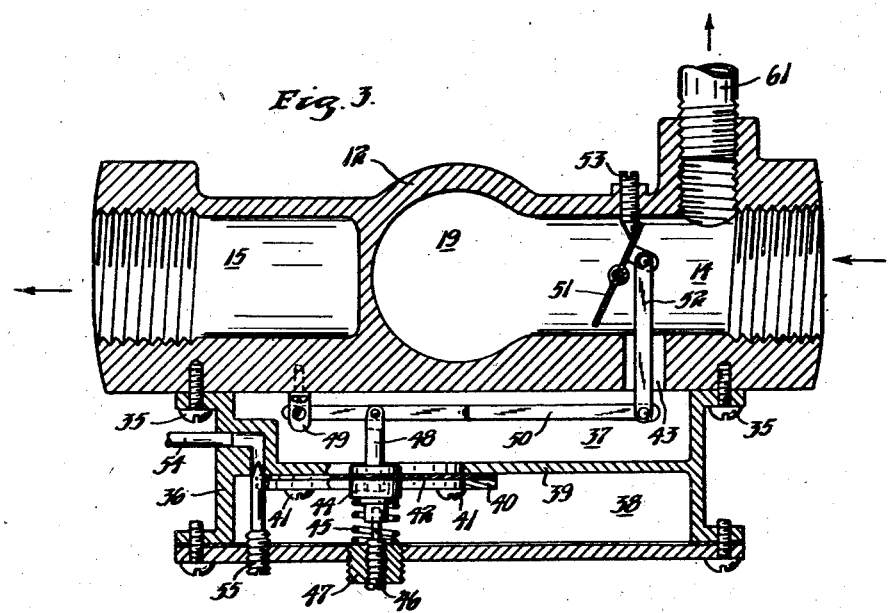
Inventor
SIDNEY K. MALEK
George H. Fisher
Attorney Patented Jan. 21, 1947

2,414,754

UNITED STATES PATENT OFFICE 2,414,754

CONTROL DEVICE

Sidney K. Malek, Minneapolis, Minn., assignor to Minneapolis-Honeywell Regulator Company, Minneapolis, Minn., a corporation of Delaware Application July 15, 1943, Serial No. 494,800

5 Claims. (Cl. 137—144)

This invention relates to improvements in automatic control devices and more particularly to the construction and automatic control of pressure operated valves to provide a two stage or step opening action. The initial phase of the opening action comprises the quick opening of the passageway to permit a limited flow of fluid therethrough. The second phase or step of the opening action comprises the slow, gradual, opening of the passageway to a further extent to permit a controlled capacity flow therethrough. Each phase or step is performed by a separate valve and valve operating mechanism which may be controlled to operate in timed sequence.

In intermittently supplying fluid fuel to certain types of combustion chambers it is desirable that the initial portion of the flow be limited. The most economical and satisfactory results are obtained if the full flow of the supply line is brought on slowly and gradually following the relatively quick delivery of a limited initial or starting flow. Various types of step action valves have been brought forth in the past. Some were complicated and unwieldy. Others were extremely costly to produce and still others relied on foreign elements to obtain the desired opening action.

One of the principal objects of the present invention is the provision of means for economically producing a simple, efficient, and compact device comprising a relatively few interdependent parts for automatically starting and controlling the rate of flow of fluid through a supply line between the time of initial opening and the time the flow has reached capacity.

Another object of importance and advantage resides in the provision of means for utilizing fluid under pressure from the main supply line for quickly and fully opening a main supply valve in combination with auxiliary means permitting the passage of a limited flow of fluid through the fully open main valve and then automatically, slowly and gradually increasing the flow to a predetermined capacity.

A further object of advantage of the improved device of this invention is the provision of means for completing the operation cycle by closing the main valve and then restoring the auxiliary control to a desired minimum flow position.

Still another important object of advantage is the provision of means for associating a retarded acting auxiliary pressure motor for operation in conjunction with a quick acting main valve operating pressure motor for operating two devices in timed relation and particularly for controlling the initial and the immediately subsequent flow of fluid through a supply line.

An additional object of importance resides in the provision of means for adjusting a control valve to supply a desired minimum or maximum flow of fluid through a supply line during the period a shut off valve in said supply line is in open position.

Another object of importance and advantage resides in the provision of means for utilizing the pressures built up within the outlet end of the improved device of this invention for moving the auxiliary control valve from minimum flow to full flow position.

A still further object of the invention is the provision of means for starting an initial minimum flow of fluid through a supply line and then by auxiliary means of slowly and gradually increasing the flow to capacity in a single, continuous operation.

Additional objects of advantage and importance will become apparent as the following detailed description progresses, reference being had to the accompanying drawings wherein Figure 1 is a schematic showing of a gas burner control system which embodies the invention;

Figure 2 is a front elevational view of the device, parts thereof being broken away;

Figure 3 is a sectional view taken on line 3—3 of Figure 2; and

Figure 4 is a similar section showing a slight modification in construction.

The reference numeral 10, indicates generally a diaphragm valve which may be of any suitable size or shape. The valve 10 is preferably constructed of an upper section 11 and a lower section 12 with a diaphragm 13 clamped therebetween, as is best shown in Figure 2 of the drawings. The lower section 12 of the improved device of this invention comprises a valve housing having an inlet 14 at one end, and an outlet 15 at the other end thereof. Positioned intermediate the inlet 14, and the outlet 15 is a valve seat 16. The valve seat 16 is preferably concentric and normally on a common plane with the diaphragm 13. The upper central portion of the diaphragm 13 is provided with a plate 17, which may be secured in position by means of a bolt and nut assembly 18, or in any other suitable manner. The reinforced diaphragm 13 thus cooperates with the valve seat 16 to provide a normally closed valve which prevents the flow of fluid from the inlet to the outlet compartments of the housing 12. A pressure chamber 19 is thus provided in the central portion of the section 12 beneath the diaphragm 13. The upper section 11 of the device is preferably recessed or dished, as is clearly shown in Figure 2, to provide a chamber 20 above the diaphragm 13. The diaphragm 13 is disposed to provide a movable wall dividing the chambers 19 and 20. The diaphragm valve 13 in cooperation with the valve seat 16 functions to prevent or to permit a flow of fluid from the inlet to the outlet. The valve 13 does not limit or control the volume of flow through the passageway.

Suitably secured to the body of the diaphragm valve 10 is a three-way control valve 22. The central portion of the control valve 22 is recessed at 24 to receive a solenoid operated ball valve assembly 26. Extending from the inlet 14 into the upper portion of the recess 24, is a passageway 27. A passageway 28 extends from the chamber 20 into the lower portion of the recess 24. A valve seat 30 is positioned in the recess intermediate the entry points of the passageways 27 and 28. Extending from the bottom of the recess 24, to a remote location, preferably a burner unit 32, is a waste disposal passageway 34. The three-way control valve functions to supply fluid to the chamber 20 when in its normal position, as shown in Figure 2. Fluid from the inlet may pass upwardly through the passageway 27 into the recess 24, and then downwardly through the valve seat 30, into the lower portion of the recess from which it is directed into the chamber 20 through the passageway 28. When the ball valve 26 is raised the upper portion of the recess 24 and the passageway 27 are sealed off and the chamber 20 is in communication with atmosphere through the passageways 28 and 34.

Secured to the body of the diaphragm valve 10, preferably by screws 35, 35 is an auxiliary pressure motor 36. The auxiliary pressure motor comprises two chambers 37 and 38 having an apertured dividing wall 39 positioned therebetween. Secured to the dividing wall 39 by means of a ring 40 and screws 41, and covering the aperture in said dividing wall, is a diaphragm 42. The chambers 37 and 38 are thus sealed against the passage of fluid from one to the other. A passageway 43 through the wall of the lower section 12 permits the unrestricted flow of fluid from the inlet 14 into the chamber 37.

Secured to the central portion of the diaphragm 42 and projecting upwardly and downwardly therefrom is a button 44. The peripheral surface of the lower portion of the button 44 is formed to receive a compression spring 45, and the end of said button 44 is recessed to receive the end of an adjustment screw 46. The compression spring 45 is interposed between the wall of the auxiliary motor and the button 45 to yieldably resist movement of the diaphragm 42 into the chamber 38. Tension adjustment of the spring 45 may be made through a spring adjustment screw 47. The adjustment screw 46 limits the travel of the diaphragm 42 and the button 44, into the chamber 38. In the preferred embodiment of the invention, as shown in Figure 3, the engagement of the screw 46 with the button 44, also limits the opening movement of the control valve 51.

Secured to the button 44 and extending into the chamber 37, is an operating post 48. The post 48 is movable with the diaphragm 42. Secured to the member 12 closely adjacent one end of chamber 37 is an anchor member 49. Pivotally secured to the anchor member 49 and extending substantially the length of the chamber 37 is a valve operating arm 50. Operably positioned in the intake 14, intermediate the end thereof and the chamber 19, is a butterfly valve 51. A link 52 provides a means for connecting the butterfly valve 51 to the free end of the operating arm 50. An adjustable stop member 53 is provided to limit the closing movement of the butterfly valve 51. The post 48 is secured to the operating arm 50, intermediate the ends thereof, to provide operating means for opening and closing the valve 51.

Extending from the chamber 38 into the interior of the chamber 20 is a passageway 54. The passageway 54 provides a means for equalizing the pressure within the chambers 20 and 38 regardless of the pressure built up within the chambers 19 and 37. Operably positioned to control the flow of fluid through the passageway 54 is an adjustable restricting member 55. The member 55 may be adjusted to control the rate of flow of fluid through the passageway 54 thus controlling the speed of the movement of the diaphragm 42.

Operation of Figure 1

In the preferred embodiment of the invention, as shown in Figures 1, 2, and 3, a call for burner action operates the thermostat 60 closing the circuit 62 and activating the solenoid assembly 64, whereby the ball valve 26 is moved into sealing engagement with the valve seat 30. This action connects the passageway 28 with the open passageway 34, thus providing an escape for the fluid in the chamber 20. Fluid pressure in the chamber 19 urges the diaphragm valve 13 from the seat 16 and expels a portion of the fluid from the chamber 20. This action establishes a minimum flow of fluid from the inlet 14, past the partially open butterfly control valve 51 and through the chamber 19 into the outlet 15 thus completing the first phase or step of the opening action of the improved device. Concurrently with the reduction of pressure in the chamber 20 a slow flow of fluid is started from the chamber 38 through the restricted passage 54, into the chamber 20. As the pressure in the chamber 38 is slowly reduced, the diaphragm 42 is urged from the chamber 37. This movement of the diaphragm 42 is transmitted to the connected control valve 51. Opening movement of the diaphragm 42 and the connected control valve 51 may be retarded by the restriction control member 55 and limited by the adjustable stop member 46. The compression spring 45 also delays the starting and opening action of the diaphragm 42. When the diaphragm button 44 engages the end of the adjustable stop member 46 a controlled maximum flow of fluid through the device has been established and the second phase or step of the opening movement has been completed.

It is to be noted that a single movement of the ball valve 26 starts the evacuation of the control chambers 20 and 38 concurrently. However, the restriction control member 55 may be so adjusted that the control valve 51 is maintained in minimum flow position until after the valve 13 reaches its full open position. Likewise return movement of the control valve 51 may be retarded until the diaphragm valve 13 is completely closed.

The flow of fluid through the device is stopped in a single continuous action. Action of the thermostat 60 opens the circuit 62 deenergizing the solenoid assembly 64 and freeing the ball valve 26 from sealing engagement with the seat 30. This action closes the passageway 34 and opens the passageways 27 and 28 permitting the fluid to enter the chamber 20 from the inlet 14 while preventing flow out of chamber 20 into passageway 34. The incoming fluid equalizes the pressures in the chambers 20 and 19 and moves the diaphragm 13 into sealing engagement with the seat 16 to prevent the further flow of fluid through the device. As the chamber 20 fills, a restricted flow passes into the chamber 38 restoring the diaphragm 42 to its original position and moving the valve 51 to the minimum flow position permitted by the adjustable stop member 53. Movement of the control valve 51 is terminated by the adjustable stop 53 at one end and by the adjustable stop 46 at the other end. Consequently, both minimum and maximum flow may be accurately controlled or quickly varied.

In the slightly modified form of the invention as shown in Figure 4, the pressure chamber 37 is in direct communication with the inlet 14 as is the case in the preferred embodiment as is clearly shown in Figure 3. However, the chamber 38 of the modified form is connected to the outlet 15 by means of a passageway 56. The passageway 56 is adapted to be restricted by means of an adjustment member 57. Movement of the diaphragm 42 is transmitted to the butterfly control valve 51 through an operating arm 58, which is rockably secured to an anchor member 59. The adjustment member 46 which limits the movement of the diaphragm in both constructions serves also to limit the closing movement of the butterfly control valve in the modified construction. The remainder of the structure is substantially the same as that shown in the preferred embodiment.

The various elements of the improved device of this invention, shown in Figure 4 of the drawings, are in positions they assume when there is no call for burner action. Under these conditions, fluid pressures in the inlet 14, the pilot conduit 61 and the chambers 19, 20 and 37 are equalized; the valves 13 and 51 are in closed and minimum flow positions, respectively; and the passageway 34 is closed by the ball valve 26.

*Operation of Figure 4*

In the modified construction shown in Figure 4, the means provided for opening the control valve 51 differ slightly from the means shown in Figure 3 of the preferred form of the invention. The chamber 37 is in open communication with the inlet 14 and the pressure therein is utilized for maintaining the control valve 51 in minimum flow position against the action of the spring 45, the chamber 38 having only atmospheric pressure therein when the diaphragm valve is closed. The control valve 51 is moved into open position by diverting a portion of the fluid passing through the outlet 15 into the chamber 38 by way of the restrictable passageway 56 when the diaphragm valve 13 is opened by action of the thermostat 60. The compression spring 45 also assists in this movement. As the pressure in the chamber 38 builds up the diaphragm 42 and the connected control valve 51 are moved into open position. When the thermostat 60 is satisfied the diaphragm valve 13 closes as explained in connection with the operation of Figure 1, whereupon the pressure in the chamber 38 begins to bleed off. As the pressure in the outlet 15 drops, the fluid in the chamber 38 is slowly bled through the restrictable passageway 56 into the outlet 15. The reduction of pressure in the chamber 38 permits the pressure in the chamber 37 to overcome the resistance of the spring 45 and the diaphragm moves in a downward direction to the position shown in Figure 4, until the diaphragm button 44 engages the upper end of the adjustable stop 46, to accurately position the control valve 51 to permit a predetermined minimum flow of fluid.

It will be apparent from the foregoing that the improved device of this invention lends itself to employment in conjunction with a thermostat controlled electric circuit 60 or any other operating device which may be employed to open and close the ball valve 26.

It will also be apparent from the foregoing that herein is provided an exceptionally sturdy and efficient device which employs one valve and valve operating mechanism for starting and stopping all flow of fluid through a supply line and a second control valve which functions to control the flow of fluid after the initial opening of the line, both valves cooperating in closely timed and controlled movements to produce a unitary result.

Various changes and modifications in the above device will undoubtedly occur to those who are skilled in the art, and I therefore desire to be limited by the scope of the appended claims rather than by the specific embodiment which has been disclosed for the purpose of illustration only.

I claim as my invention:

1. In a control device, a supply line, means for establishing an adjusted maximum flow through said line in a plurality of steps and comprising, a first pressure motor in association with a first valve, a second pressure motor in association with a second valve, a passageway connecting said motors, said valves being positioned in series in said supply line, said first named valve being operable between closed and open position, said second valve being operable between an adjustable minimum flow and an adjustable maximum flow position, adjustable abutment means for determining the minimum flow position and the maximum flow position of said second valve, means in said connecting passageway for controlling the rate of flow of operating pressure to and from said second motor and hence the rate of movement of said second valve, said last named means being adjustable from the exterior of said device, and a single pilot valve for controlling all operable movement of said first and said second valves.

2. In a control device, a valve housing having an inlet and an outlet, a first valve positioned in said housing intermediate said inlet and said outlet, a first pressure motor for operating said first valve, said motor being operable to move said valve to open and closed positions, a butterfly valve pivoted in the inlet portion of said housing, abutment means adjustably associated with said housing and operable by engagement therewith to arrest the closing movement of said butterfly valve at a selected point in its travel, a second pressure motor for operating said butterfly valve, said second motor including a movable wall having a pressure chamber on each side thereof, a passageway connecting one of said chambers with said inlet and providing means for exerting a constant pressure against said movable wall, a passage connecting the other of said chambers with said first pressure motor and providing means for varying the pressure in said other chamber, means for selectively controlling flow through said last named passage to control the rate of operable movement of said second pressure motor, abutment means for selectively governing the extent of movement in an opening direction of said second pressure motor and associated butterfly valve, and a pilot valve connected to said first motor and providing means for controlling opening and closing movement of said first and said second pressure motors.

3. In a fluid flow control apparatus comprising, a first pressure motor operated valve operable to open and closed positions, a second motor operated valve, means operable to selectively adjust the rate of movement of said second valve without curtailing the extent of its movement, a first abutment means operable to engage said said second valve near its closing terminal to permit a minimum flow therethrough, said first abutment means being adjustable from the exterior of said apparatus to selectively vary said minimum flow, a second abutment means operable to limit the opening movement of said second valve to permit a maximum flow therethrough, said second abutment means being adjustable from the exterior of said apparatus to selectively vary the said maximum flow, means for exerting a constant pressure to urge said second valve toward and maintain it in maximum flow position when said first valve is in open position, and a single pilot valve operable to initiate opening and closing movement of said first and said second motor operated valves.

4. In a control apparatus, a valve housing having an inlet and an outlet, a first motor operated valve positioned intermediate said inlet and said outlet, said valve being operable to open and closed positions, a second motor operated valve positioned intermediate said first valve and said inlet, adjustable abutment means for selectively limiting the extent of operable movement of said second valve in opening and closing directions, passage means connecting the motors of said motor operated valves, adjustable means in said passage means for adjusting the rate and causing opening and closing movement of said second motor operated valve to trail opening and closing movement of said first motor operated valve, the motor of said second motor operated valve being operable to maintain said valve in engagement with different portions of said adjustable abutment means when said first motor operated valve is in open or closed position, and a single pilot valve operable to control movement of both of said motor operated valves.

5. In a flow control device comprising in combination, a supply line, a first valve positioned in said supply line and operable to start and stop flow therethrough, a first motor for operating said first valve, a second valve positioned in said supply line and operable to minimum and maximum flow positions, a second motor for operating said second valve, a passage connecting said first and said second motors, means in said passage adjustable from the exterior of said device for governing the rate of movement of said second motor and valve, means operable from the exterior of the device for altering the minimum flow position of said second valve, means operable from the exterior of the device for altering the maximum flow position of said second valve, said second motor providing means for maintaining said second valve in minimum flow position when said first valve is in closed position and in maximum flow position when said first valve is in open position, and a single pilot valve for controlling all operable movement of said first and said second motors and valves.

SIDNEY K. MALEK.